United States Patent [19]
Förster

[11] Patent Number: 6,000,508
[45] Date of Patent: Dec. 14, 1999

[54] VIBRATION DAMPER AND A DAMPING VALVE WITH ADJUSTABLE DAMPING FORCE FOR A VIBRATION DAMPER

[75] Inventor: Andreas Förster, Schweinfurt, Germany

[73] Assignee: Fichtel & Sachs AG, Schweinfurt, Germany

[21] Appl. No.: 08/879,014

[22] Filed: Jun. 19, 1997

[30] Foreign Application Priority Data

Jun. 21, 1996 [DE] Germany ............................ 196 24 897

[51] Int. Cl.$^6$ ............................................. F16F 9/46
[52] U.S. Cl. .................................. 188/299.1; 188/322.2
[58] Field of Search ................ 188/299.1, 266.6, 188/267.1, 266.8, 266.2, 282.2, 322.13, 322.19, 322.2, 318, 282.3, 282.4, 313; 267/140.14, 140.15

[56] References Cited

U.S. PATENT DOCUMENTS

| | | | |
|---|---|---|---|
| 5,301,412 | 4/1994 | Hahn et al. ................ | 188/299.1 X |
| 5,301,776 | 4/1994 | Beck ............................ | 188/322.13 |
| 5,335,757 | 8/1994 | Knecht et al. ................ | 188/299.1 |
| 5,398,787 | 3/1995 | Woessner et al. ........... | 188/299.1 |
| 5,413,196 | 5/1995 | Forster ........................ | 188/299.1 |
| 5,651,433 | 7/1997 | Wirth et al. ................. | 188/299.1 |
| 5,850,896 | 12/1998 | Tanaka ........................ | 188/266.2 |

FOREIGN PATENT DOCUMENTS

| | | |
|---|---|---|
| 0561404 | 9/1993 | European Pat. Off. . |
| 00709474 | 5/1974 | France . |
| 3227903 | 2/1984 | Germany . |
| 3917064 | 11/1990 | Germany . |
| 4137821 | 5/1993 | Germany . |
| 4208886 | 9/1993 | Germany . |
| 4424437 | 8/1995 | Germany . |
| 56-35877 | 4/1981 | Japan . |
| 63-254245 | 10/1988 | Japan . |
| 34045 | 1/1991 | Japan . |

*Primary Examiner*—Robert J. Oberleitner
*Assistant Examiner*—Pamela J. Lipka
*Attorney, Agent, or Firm*—Nils H. Ljungman and Associates

[57] ABSTRACT

A damping valve, in particular for a vibration damper, including a cylinder filled with damping medium in which a piston rod with a piston is housed. The piston rod can move axially and the piston divides the cylinder into two working chambers. The damping valve can be adjusted by means of a magnet coil in connection with an armature and has an emergency operating setting. A stop is provided for the valve position for the emergency operating setting. The position of the stop relative to the armature can be used to define a passage cross section for the emergency operating setting.

13 Claims, 7 Drawing Sheets

VIBRATION DAMPER AND A DAMPING
VALVE WITH ADJUSTABLE DAMPING
FORCE FOR A VIBRATION DAMPER

BACKGROUND OF THE INVENTION

1. Field of the Invention

The present invention relates generally to a damping valve with adjustable damping force for a vibration damper. The vibration damper includes a cylinder filled with damping medium. In the cylinder a piston rod with a piston is contained so that the piston rod can move axially and the piston can divide the cylinder into two working chambers. The damping valve can be adjusted by means of a magnet coil or solenoid in connection with an armature. The damping valve can have an emergency operating setting.

2. Background Information

A known damping valve similar to that described above is disclosed in German Patent No. 42 08 886 A1. The essential advantage of the valve is that a damping force characteristic which differs from the maximum hard setting can be provided as the emergency operating setting. One problem of these known damping valves is that the magnitude of the flow cross section in the emergency operating setting is, to a significant extent, dependent on the tolerances of some of the components, whereby the effect of these tolerances is cumulative.

A known damping valve as described in German Patent No. 39 17 064 A1 does not have this problem. In this damping valve, a separate bypass was provided which is active in the emergency operating position. The emergency operating setting is defined by two-seat valves, whereby one valve seat, in terms of its action, can be considered a hydraulic switch.

OBJECT OF THE INVENTION

The object of the present invention is to find an additional or alternative solution to the problem described above.

SUMMARY OF THE INVENTION

The present invention teaches that this object can be accomplished in accordance with at least one possible embodiment, by an arrangement in which there is a stop for the valve position of the emergency operating setting. The position of the stop relative to the armature can be used to define a passage cross section for the emergency operating setting. A separate stop makes possible an individual emergency operating setting. In contrast to the known devices described above, the valves used do not necessarily have to be realized in the form of seat valves. The use of the stop makes a bypass unnecessary.

In an additional advantageous embodiment, the stop can be displaced axially, e.g. by means of a set screw. An emergency operation valve part can thereby be adjusted continuously. Thus, it becomes possible to fully compensate for the unavoidable manufacturing tolerances of the individual components.

The present invention teaches that the damping valve is located in a housing of a shutoff valve device. The set screw penetrates the housing so that access is possible from outside the shutoff valve device. On account of this constructive measure, calibration can be performed even after the entire valve has already been installed.

The armature has an emergency operation valve part and a normal operation valve part, each of which interacts with a respective control edge. For an emergency operating setting which is independent of distance, travel, stroke, or length, the emergency operation valve part has an emergency operating constant throttle. The emergency operating constant throttle is smaller than a passage cross section on the control edge of the normal operation valve part. The passage cross section is adjacent to the emergency operating constant throttle.

The maximum diameter of the armature is no larger than the diameter of the set screw. The valve part of the armature which lies on the other side of both control edges is realized in the form of a gate valve, so that after the set screw has been removed, the armature can be removed from the damping valve.

For an independent setting of the emergency operating device, in the emergency operating setting there is an axial separation, gap or distance between the set screw and the end of the armature facing the set screw. The separation represents the adjustment range of the stop.

The set screw also has a bearing for the armature. Together with an additional bearing on the other end of the armature, the result is very good guidance or control.

The stop also has snap hooks which apply a bias to a stop seal which seals an armature reaction chamber or space from the environment of the damping valve.

As an alternative to the adjustable stop, the stop can be realized in the form of a spacer ring. The spacer ring is located in the direction of movement of the armature in the emergency operating setting of the damping valve. On mass-produced models in particular, there is a standard setting which represents the most common setting. A stop which has a coordinated height can also be used successfully for this standard setting.

To reduce wear and to prevent unpleasant noises, the stop is made of an elastic material. The stop should also be made of a material which has a low relative permeability, so that a magnetic flux or the resulting force does not result in any adherence or sticking between the armature and the stop. The desired level for the relative permeability is approximately 1.

In another possible embodiment, the stop should have a relative magnetic permeability of approximately 1. Relative magnetic permeability can be defined as the ratio of the magnetic permeability of the material divided by the magnetic permeability of air. Magnetic permeability is generally defined as the ability of a medium to alter a magnetic field. By keeping the relative magnetic permeability of the stop close to 1, it can be ensured that the stop will have substantially no effect on the magnetic field generated by the solenoid.

The present invention also teaches that the adjustable damping valve is actuated by a pilot valve. The damping valve is in communication, via an opening, with a control chamber. Whereby, by means of the pressure in the control chamber, a closing force is exerted on the shutoff valve body. The pressure in the control chamber is a function of the magnitude of a throttle cross section. The magnitude of the throttle cross section can be modified by means of the actuator, whereby the throttle cross section of the pilot valve for the damping valve influences the pilot cross section.

The above discussed embodiments of the present invention will be described further hereinbelow with reference to the accompanying figures. When the word "invention" is used in this specification, the word "invention" includes "inventions", that is, the plural of "invention". By stating "invention", the Applicant does not in any way admit that the present application does not include more than one patentably and non-obviously distinct invention, and maintains that this application may include more than one patentably and non-obviously distinct invention. The Applicant hereby asserts that the disclosure of this application may include more than one invention, and, in the event that there is more than one invention, that these inventions may be patentable and non-obvious one with respect to the other.

BRIEF DESCRIPTION OF THE DRAWINGS

The present invention is explained in greater detail below with reference to the embodiments illustrated in the accompanying drawings, wherein.

DESCRIPTION OF THE PREFERRED EMBODIMENT

Figure 1:
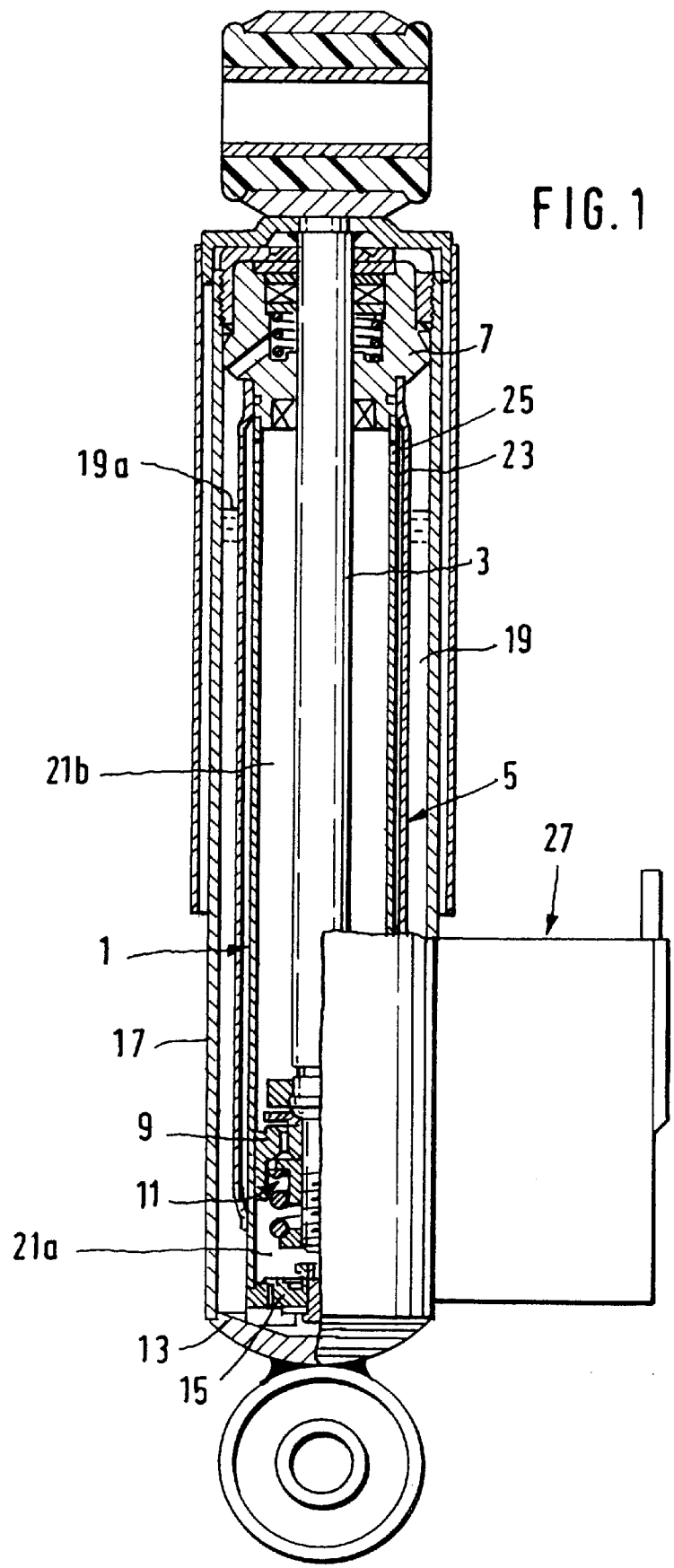
FIG. 1 shows an overall view of a vibration damper.

In FIG. 1, a vibration damper has a cylinder 1 in which cylinder a piston rod 3 can be located so that the piston rod 3 can move axially. A guidance and sealing unit 7 can guide the piston rod 3 as it moves out of an upper end of the cylinder 1. Inside the cylinder 1, a piston unit 9 with a piston valve system 11 can be fastened to the piston rod 3. A lower end of the cylinder 1 can be closed by means of a bottom or base plate 13 which has a bottom valve system 15. The cylinder 1 can be surrounded by a reservoir tube or outer tube 17. The reservoir tube 17 and an intermediate tube 5 can form a ring-shaped chamber 19. The ring-shaped chamber 19 represents an equalizing chamber. The space inside the cylinder 1 is preferably divided by the piston unit 9 into a first working chamber 21a and a second working chamber 21b. The working chambers 21a and 21b are preferably filled with hydraulic fluid. The ring-shaped chamber or equalizing chamber 19 can be filled up to the level 19a with fluid and above that with gas. Inside the equalizing chamber 19 there is a first line segment, namely a high pressure segment 23, which can be in communication, via a boring 25 of the cylinder 1, with the second working chamber 21b. Connected to this high pressure segment 23 is a shutoff valve device 27 which can be attached laterally to the reservoir tube 17. From this shutoff valve device 27, a second line segment (not shown), namely a low pressure line segment, can lead into the equalizing chamber 19.

In other words and in accordance with another possible embodiment, the high pressure segment, high pressure line or high pressure connection 23 can be located between the cylinder 1 and the intermediate tube 5. The high pressure line 23 is preferably connected to a shutoff valve device 27. The low pressure segment, low pressure line or low pressure connection can connect the shutoff valve device 27 to the equalizing chamber 19.

As the piston rod 3 is moved upward and out of the cylinder 1, the upper working chamber 21b can become smaller. An overpressure builds up in the upper working chamber 21b, which overpressure can be dissipated by the piston valve system 11 into the lower working chamber 21a, only as long as the shutoff valve 27 is closed. When the shutoff valve device 27 is opened, fluid can flow simultaneously from the upper working chamber 21b through the high-pressure line segment 23 and the shutoff valve device 27 into the equalizing chamber 19. The damping characteristic of the vibration damper as the piston rod 3 is extended therefore can depend on the extent to which the shutoff valve device 27 is open or closed. The shutoff valve device 27 can thereby be adjusted either in discrete stages or continuously.

As the piston rod 3 is inserted into the cylinder 1, an overpressure can be formed in the lower working chamber 21a. Fluid can flow from the lower working chamber 21a through the piston valve system 11 upward into the upper working chamber 21b. The fluid displaced by the increasing piston rod volume inside the cylinder 1 can be expelled through the bottom valve system 15 into the equalizing chamber 19. An increasing pressure can also occur in the upper working chamber 21b, because the flow resistance of the piston valve system 11 is lower than the flow resistance of the bottom valve system 15. If the shutoff valve system 27 is open, this increasing pressure can overflow through the high pressure segment 23 into the equalizing chamber 19. In other words, when the shutoff valve device 27 is open, the shock absorber can have a softer characteristic even when the piston rod 3 is being inserted, and a harder characteristic when the shutoff valve device 27 is closed, and likewise when the piston rod 3 is extended. It should be noted that the direction of flow through the high pressure segment 23 of the bypass is preferably always the same, regardless of whether the piston rod 3 is moving into or out of the cylinder 1.

In another possible embodiment of the present invention, the shock absorber can have a softer characteristic when the shutoff valve 27 is open and a harder characteristic when the shutoff valve 27 is closed. The shock absorber can have the above characteristics regardless of whether the piston rod 3 is being inserted or extended.

Figure 2:
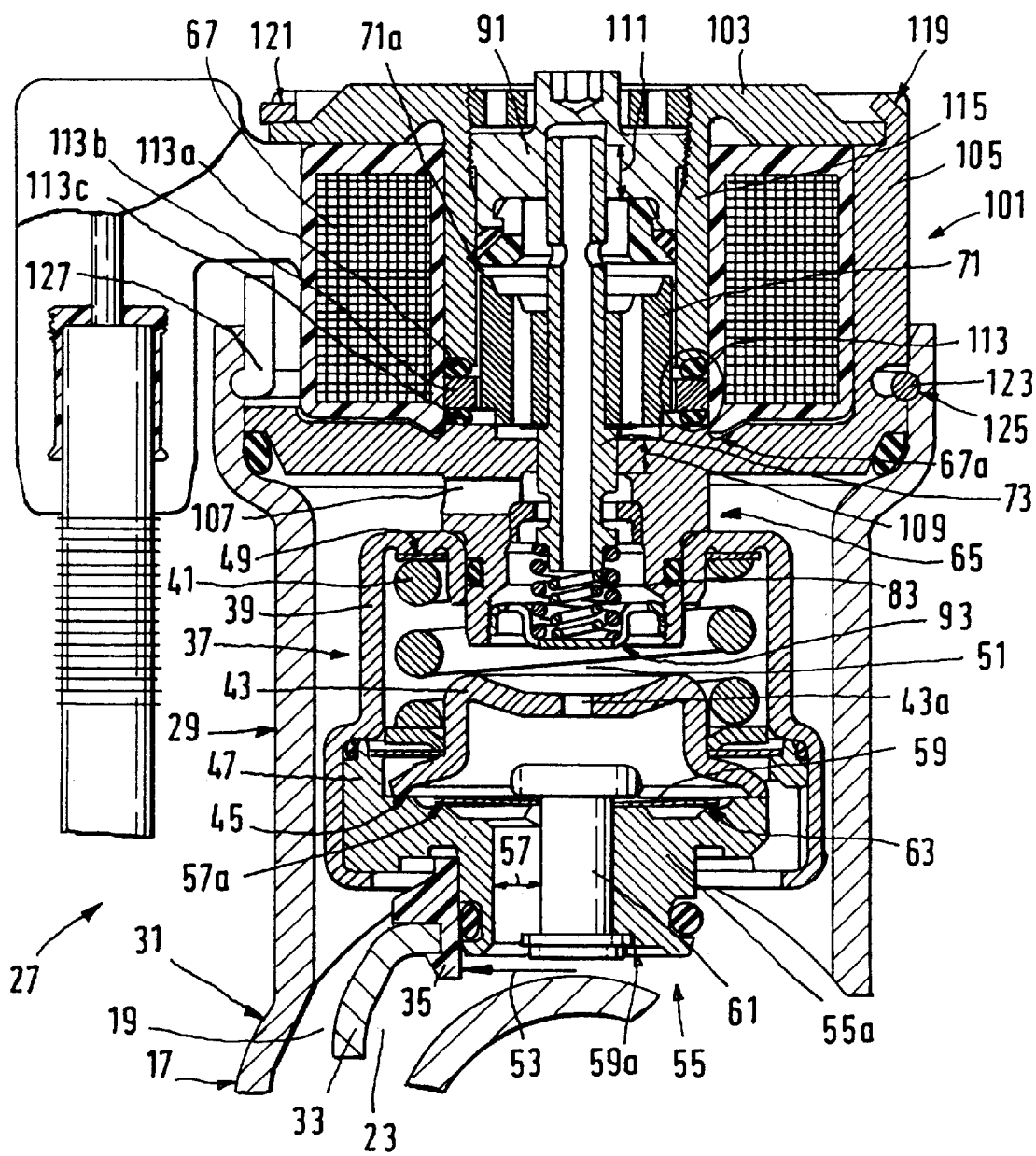
FIG. 2 shows a section through a shutoff valve device.

FIG. 2 is restricted to an illustration of the shutoff valve device 27. The shutoff valve device 27 can be connected by a pipe socket 29 to a connecting pipe 31 of the reservoir tube 17. The high pressure segment 23 can be formed by the intermediate tube 5 which has a connecting opening 33 to the shutoff valve device 27. The connecting opening 33 of the intermediate tube 5 can have a cinched intermediate ring 35 which forms an attachment to a main stage valve 37.

The main stage valve 37 can comprise, inside a main stage valve housing 39, a spring 41 which can bias a shutoff valve body 43 against a shutoff valve seat 45. The shutoff valve seat 45 can be a component of a disc body 47. The disc body 47 can define the end of the main stage valve housing 39. The spring 41 can be supported on a rear wall 49 of the main stage valve housing 39, whereby the rear wall 49, the main stage valve housing 39 and the disc body 47 together can form a control chamber 51. The design of the pressurized surfaces on the main stage valve 37 preferably follows the principle that the valve-opening surfaces must be larger than the valve-closing surfaces. Consequently, when the incoming flow to the main stage valve 37 is routed via a central channel 53 inside the intermediate tube 5, a downward movement of the shutoff valve body 43 must preferably always be executed when the spring force of the spring 41 is overcome. The main stage valve housing 39 represents an independent assembly unit which can be subjected to separate inspection and testing.

An admission valve 55 can be located inside the central channel 53. The admission valve 55 includes an admission cross section 57 which can be covered by at least one valve disc 59. In FIG. 2, the plane of the section has been cut through an admission cross section 57 and a web 55*a* of the admission valve 55. A plurality of admission cross sections 57 can be used which are separated by the webs 55*a* in the admission valve 55. By means of the admission valve 55, in both the decompression or rebound direction and in the compression direction, a damping force can be produced in a range of velocities of the damping medium. The main stage valve 37 and/or a pilot valve 65 can be open, so that overall, the damping force characteristic in this velocity range has a tendency to rise to a higher damping force, without any additional efforts or arrangements having to be made on the piston valve 11 and on the bottom valve 15, because as described above, the shutoff valve device 27 is active for both directions of movement of the piston rod 3.

Figure 2A:
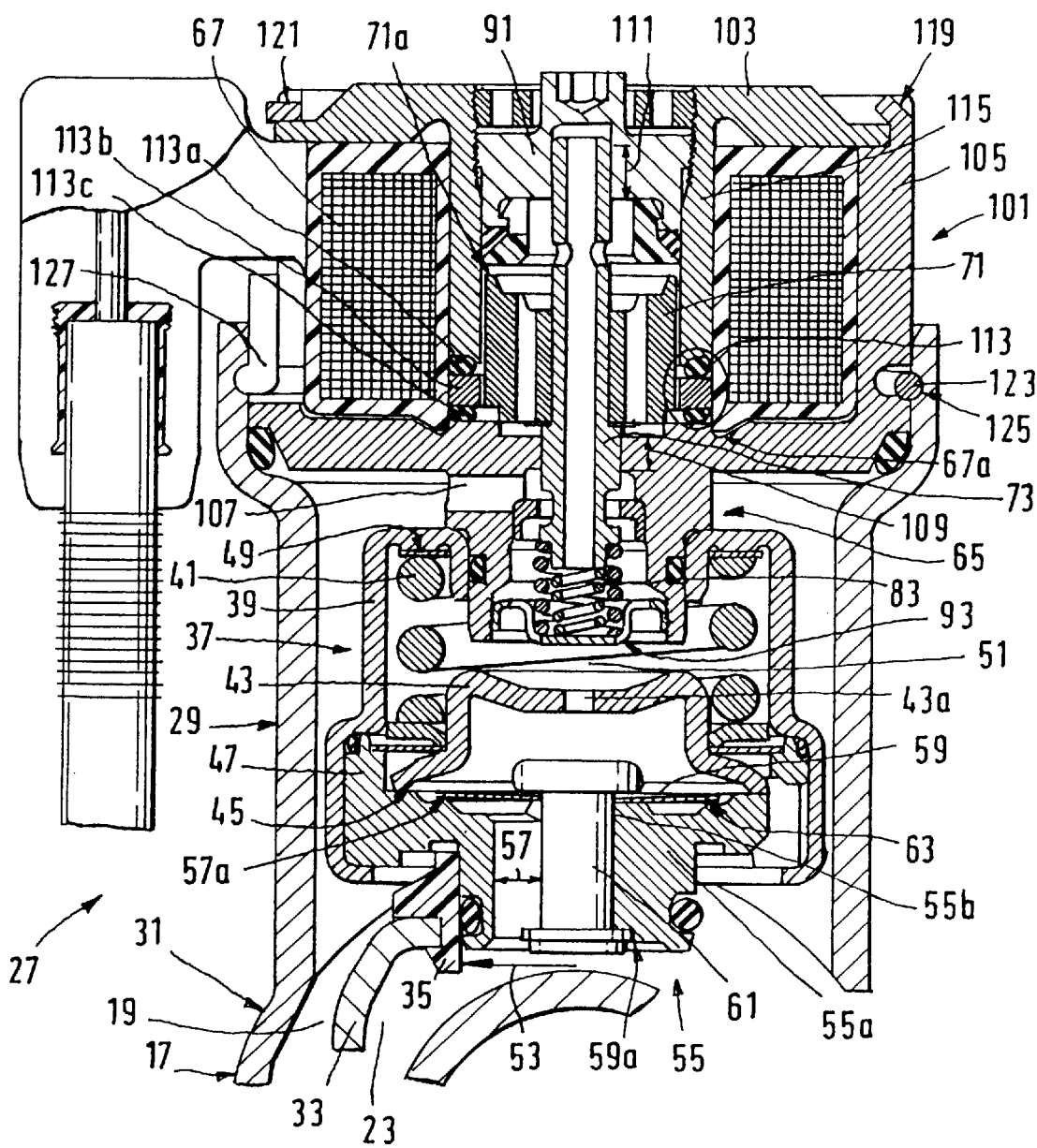
FIG. 2A shows additional features of the shutoff valve device of FIG. 2.

The at least one valve disc 59 can be held on the admission valve 55 by a rivet 61. The webs 55*a* can form an opening 55*b* (see FIG. 2A) for this purpose. The webs 55*a* preferably have no connection in the peripheral direction in the vicinity of the opening 55*b*. In practical terms, the end surfaces of the webs 55*a* center the rivet 61. Instead of a rivet 61, a screw can also be used. By changing the deformation or bowing of the at least one valve disc 59, the damping force characteristic of the admission valve 55 can be adapted to meet specific requirements. A pilot opening cross section 57*a* or a pilot throttle by means of an additional pilot throttle disc 59*a* can also be realized to create a range in which the damping force characteristic of the admission valve 55 is progressive. For the at least one valve disc 59, a valve seat surface 63 which is independent of the shutoff valve body 43 can be worked into the disc body 47.

The main stage valve 37 can be controlled by the pilot valve 65. The damping medium preferably flows through an opening 43*a* of the shutoff valve body 43 toward the pilot valve 65. The opening 43*a* and the inlet cross section 57 can be separated radially from one another, so that the dynamic or impact pressure of the damping medium flowing out of the main stage valve 37 does not act in full on the pilot valve 65.

In another possible embodiment of the present invention, the opening 43*a* and the inlet cross section 57 can be positioned to be off-center from one another or be substantially non-colinear. The misalignment of the opening 43*a* and the inlet cross section 57 can be used to prevent the full impact of the pressure of the damping medium from acting on the pilot valve 65.

Figure 3:
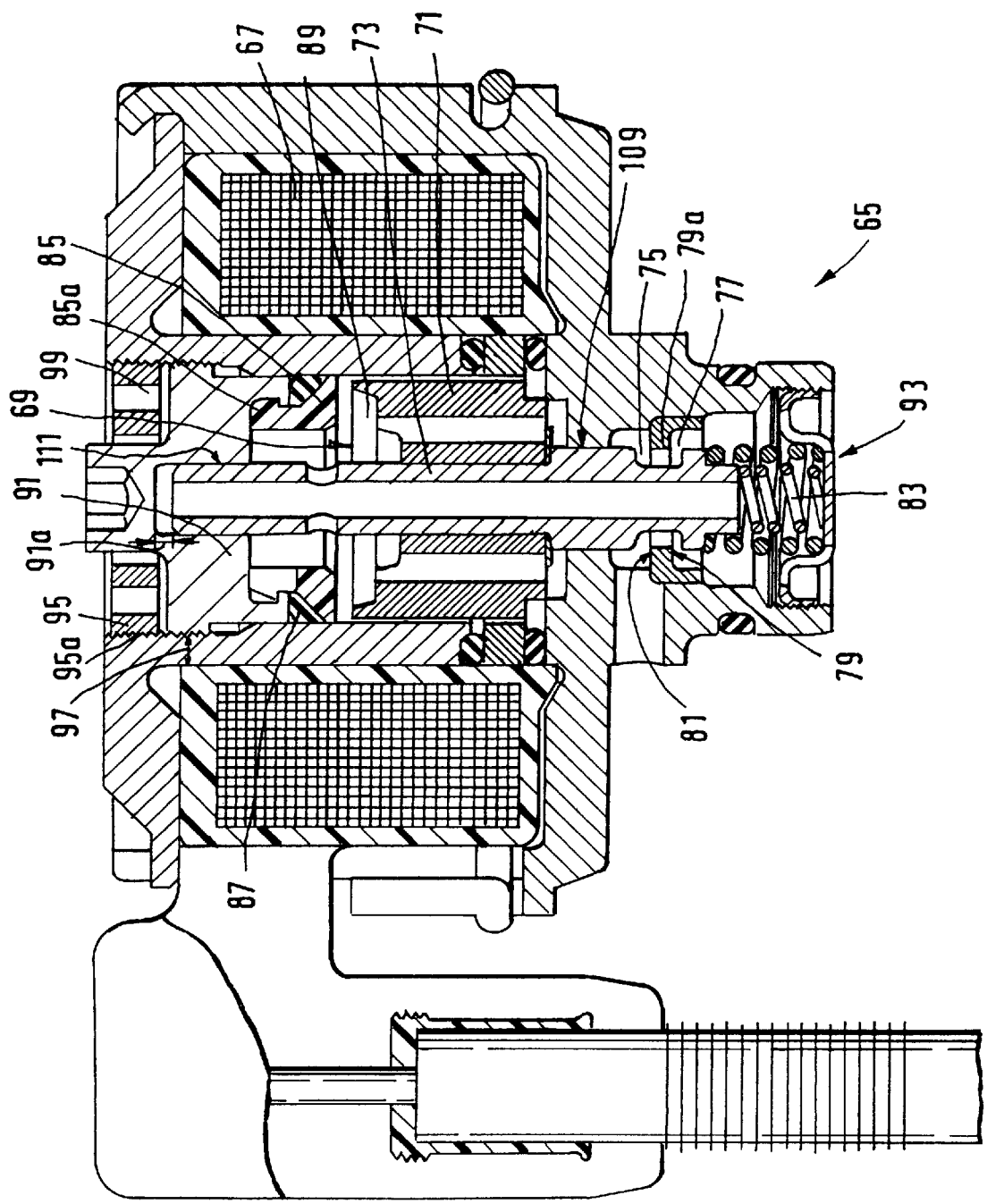
FIG. 3 is a section through the pilot valve of the shutoff valve device.

The pilot valve 65 is shown on an enlarged scale in FIG. 3. The setting of this pilot valve 65 can be modified by an actuator in the form of a magnetic coil or solenoid 67 in connection with an armature 69. The armature 69 can include a magnetically conductive ring-shaped body 71, in which ring-shaped body 71 there is a non-magnetic shaft body 73. The shaft body 73 can be realized in the form of a tube, so that the hydraulic pressure on the armature 69 can be considered to be equalized. The pilot valve 65 can be realized on the end of the shaft body 73 facing the main stage valve 37. The pilot valve 65 can have a valve part 75 for normal operation and a valve part 77 for emergency operation of the shutoff valve device 27. The normal operation valve part 75 can optionally be realized in the form of a seat, gate or sliding valve. The emergency operation valve part 77 can be realized in the form of a gate valve and can interact with a control edge 79. The control edge 79 preferably lies opposite a valve seat 81 for normal valve operation. Consequently, the passage cross section of the normal operation valve part 75 must preferably be increased by the extent to which the passage cross section of the emergency operation valve part 77 decreases.

A minimum passage cross section for emergency operation can be defined by a notch 79*a* in the control edge 79 or in the emergency operation valve part 77. In this consideration, it must be taken into account that above a defined magnitude of the passage cross section for the normal operation valve part 75, there is preferably no longer any change in the pilot action or in the effect of the pilot valve 65. This magnitude can be defined by the stroke length or distance. Consequently, the action of the two valve parts 75, 77 can be set independently by means of the stroke length. A spring set 83 can be used which, in this example, is realized in two parts or pieces. A one-piece spring can also be used, if the spring in question has a non-linear spring rate, i.e. the spring rate increases with increasing spring travel.

In another possible embodiment of the present invention, the stroke length or distance can equal the distance between the normal operation valve part 75 and the emergency operation valve part 77 on the shaft body 73.

In the embodiment of FIG. 3, the above-mentioned non-linear spring rate has preferably been realized by means of two springs. The two springs preferably have significantly different individual spring rates. A longer spring with a lower spring rate can always be in contact with the shaft body 73 and can apply a bias to the shaft body 73 against the magnetic force or, in emergency operation, against a stop 85. The shorter spring can be active only when the armature 69 is in normal operation. Otherwise, there is preferably no contact between the shaft body 73 and the shorter spring.

The stop 85, by means of its position, can define the passage cross section in emergency operation, since the ring-shaped body 71 can be supported with its reverse side on the stop 85. The stop 85 can include a non-conducting material which has a relative permeability of approximately 1, so that no losses in the magnetic flux occur, and so that the armature 69 does not adhere to the stop 85. Behind the stop 85 there can be a stop seal 87. The stop seal 87 can seal an armature reaction chamber 89 from the environment. The stop 85 is also preferably made of an elastic material.

Behind the stop 85 there can be a set screw 91. The set screw 91 can be adjusted axially with respect to the ring-shaped body 71 by means of a thread together with the stop 85. When the shutoff valve device 27 has been completely installed, the passage cross section can be continuously adjusted for emergency operation by means of this set screw 91, without thereby significantly affecting the normal operation valve part 75, because the valve parts 75, 77 are separated by means of the stroke in connection with the special or individual springs or spring set 83. There can be an axial distance 91*a* between the set screw 91 and the end of the armature 69 closer to the set screw 91. A connection between the set screw 91 and the stop 85, which connection applies a bias to the stop seal 87, can be made by means of snap hooks 85*a*. Alternatively, a threaded or press-fitted connection can also be used.

To adjust the normal operation valve part 75 there can be a spring support plate 93. The axial position of the spring support plate 93 can also be changed by means of a thread. The spring for the emergency operation valve part 77 can also be changed, but as described several times above, such a change has hardly any effect on the valve action of the emergency operation valve part 77 on account of the low spring rate.

As an additional means to set the pilot valve 65 there is a setting or adjustment device. The adjustment device can be realized in the form of a magnetic control, conducting or guide body 95. The magnetic control body 95 can be located in the vicinity of a magnetic constriction or narrow gap 97. The more the magnetic control body 95 is displaced by means of a thread 95*a* toward the ring-shaped body 71, the less the magnetic constriction 97 can be effective. As a result of this measure, the magnetic flux and its force on the ring-shaped body 71 can be adjusted against the force of the spring set 83 to compensate for tolerances which can influence the effect of the force of the spring set 83 on the armature 69.

To improve adjustability, the magnetic control body 95 can have tool surfaces 99 into which an adjustment tool can be introduced. The overall shutoff valve device 27 can thereby have three independent adjustment means which can influence the operational response of the pilot valve 65 and thus of the shutoff valve device 27.

The overall shutoff valve device 27, as illustrated in FIG. 2, can be located inside a housing 101. The housing 101 can have, among other things, a cover 103 and a cup-shaped locator, holder or mounting 105. The housing 101 thereby forms a part of the return body for the magnetic flux, the force of which can be used to set the armature 69. The locator 105 can form a part of the control chamber 51 and a discharge 107 from the control chamber 51 into the equalizing chamber 19. The locator 105 can also represent or provide the threaded connection for the spring support plate 93 and a first bearing 109 for the shaft body 73. A second bearing 111 can contain the set screw 91 which is screwed into the cover 103. The two bearings 109, 111 can be located far apart from one another in relation to the overall size of the pilot valve 65, so that the centering function of the two bearings 109, 111 can be considered to be extraordinarily effective. The ring-shaped body 71 of the armature 69 can be approximately in the center of the shaft body 73. Unavoidable transverse forces can act uniformly on both bearings. Additionally, the diameters of the bearings 109, 111 can be realized as rather small, so that the friction forces remain on a particularly low level.

The forces of the magnetic flux can be oriented to push the armature 69 downward toward the main stage valve 37 against the spring set 83. On the locator 105, an optimized transition can be realized on the end of the ring-shaped body 71 facing the first bearing 109. So that the effect of the magnetic flux is applied exclusively to the armature 69 to prevent a magnetic short circuit, an insulator 113 can be located immediately on the locator 105 in the vicinity of the first bearing 109. The insulator 113 can be made of a non-conducting material and thus can prevent an overflow or transmission of the magnetic flux from the locator 105 to a sleeve segment 115 of the cover 103. Between the sleeve segment 115 and the ring-shaped body 71 of the armature 69 there can be a rather large gap 71*a* which significantly restricts the guidance to the two bearings 109, 111. There is preferably no contact between the armature 69 and the sleeve segment 115. For an effective transmission of the magnetic flux, there can be a relatively large peripheral surface available on the ring-shaped body 71. The insulator 113 can comprise, among other things, a first seal or gasket 113*c*. The first seal 113*c* can be oriented toward the locator 105. The first seal 113*c* is adjacent to the actual insulator 113*b*. The insulator 113 can comprise a second seal or gasket 113*a* against the sleeve segment 115. Two seals or gaskets are used, because when a single seal is used, it is possible, on account of the bias applied and the related deformation of the seal, that contact with the ring-shaped body 71 of the armature 69 will occur. The actual insulator 113*b* can have a smaller inside diameter than the ring-shaped body 71. Therefore, contact between one of the seals and the ring-shaped body 71 can be prevented.

In another possible embodiment of the present invention, two seals 113*a*, 113*c* can be used to surround the actual insulator 113*b*. The use of a single seal can result in the seal being deformed and coming into contact with the ring-shaped body 71. To further prevent one of the seals from coming into contact with the ring-shaped body 71, the actual insulator 113*b* can be designed to have an inside diameter smaller than the inside diameter of the seals 113*a*, 113*c*. The actual insulator 113*b* may also have an inside diameter smaller than the inside diameter of the sleeve segment 115. Finally, the actual insulator 113*b* can have an inside diameter larger than the outside diameter of the ring-shaped body 71.

The magnetic coil or solenoid 67 has also been adapted to the insulator 113. The magnetic coil 67 can have a lug-shaped extension 67*a*. The lug-shaped extension 67*a* can guarantee that in no case can the first seal 113*c* be displaced into a hypothetical space between the magnetic coil 67 and the locator 105, because the contact surfaces are offset from one another. Changes in the length of the coil 67 or changes inside the clamping system, including the sleeve segment 115 and the insulator 113, as a result of thermal expansion can be compensated without the formation of a gap.

The overall housing 101 of the shutoff valve device 27 can be held together by a crimp 119 or by a circlip 121. This module can be supported on a shoulder of the pipe socket 29. To axially fix the housing 101 in position there can be an additional circlip 123 which is engaged in a locking groove 125 of the pipe socket 29 and thereby forms a snap connection. In the embodiment of the circlip illustrated on the right in FIG. 2, the circlip cannot be removed. The variant of the circlip illustrated on the left in FIG. 2 has an actuator tongue 127, the end of which can be introduced into a recess in the housing 101, to prevent any accidental opening of the shutoff valve device 27.

In another possible embodiment of the present invention, the circlip 121 and the circlip 123 can be realized as a retaining ring or similar structure.

It should be noted that the diameter of the magnetic control body 95 and of the set screw 91 can be slightly larger than the outside diameter of the ring-shaped body 71. It should also be noted that the diameter of the actual pilot valve 65 is preferably not larger than the diameter of the first bearing 109. The emergency operation valve 77 can be realized in the form of a gate valve. Therefore, the armature 69 can be removed from the shutoff valve device 27 without having to open and disassemble the entire valve. The ability to adjust the parts of the pilot valve 65 separately can be simplified by the fact that the two clamping means which act on the armature 69 each act on different ends. The stop 85 can be adjusted on the end facing the magnetic coil 67 and the spring support plate 93 can be adjusted on the end facing the main stage valve 37. The outer spring cannot fall out of the shutoff valve device 27, because the control edge 79 can act as a stop.

Figure 4:
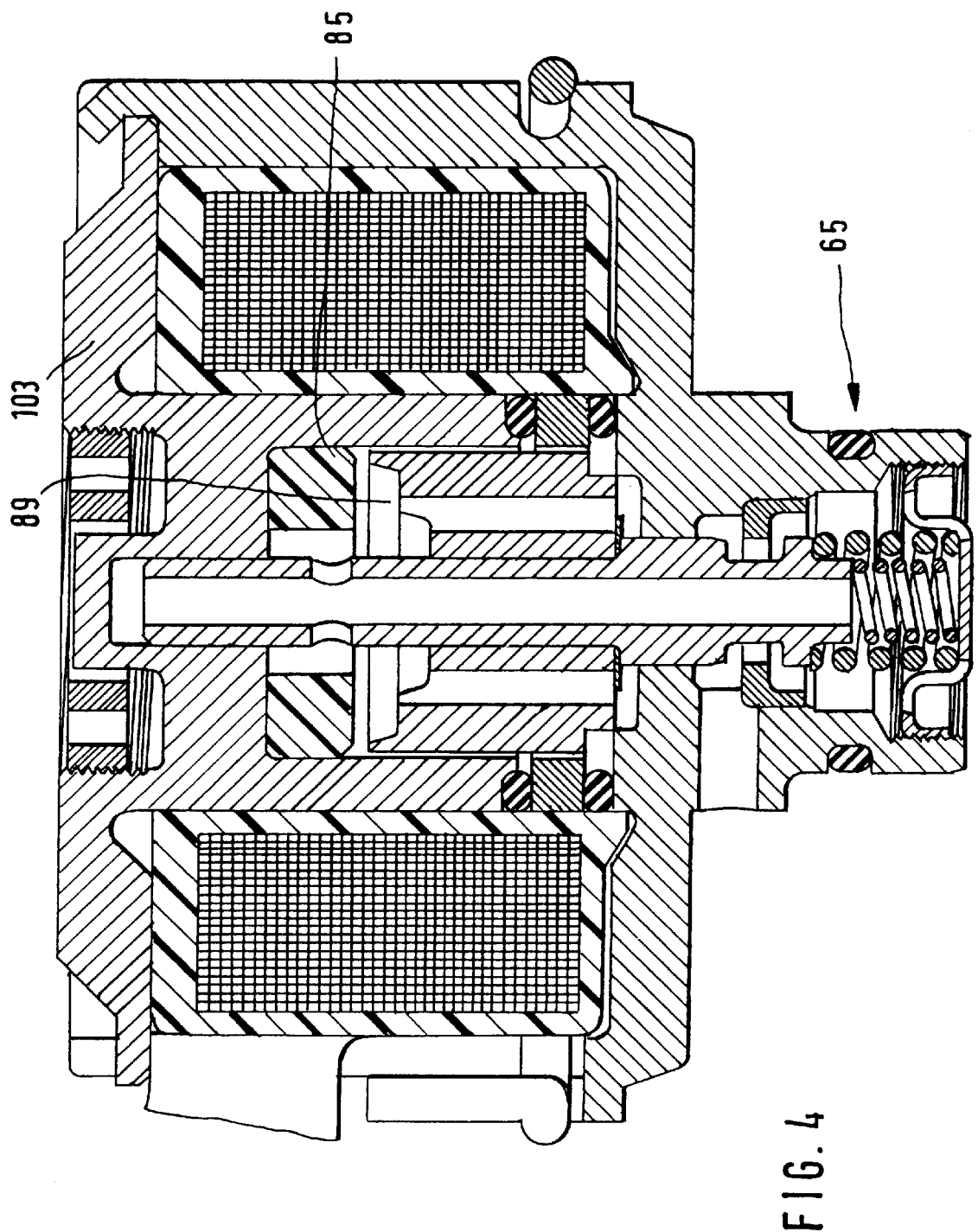
FIG. 4 shows a shutoff valve device with a fixed stop for the emergency operating setting.

FIG. 4 illustrates an embodiment which is simplified in comparison to the embodiment illustrated FIG. 2. FIG. 4 illustrates that instead of a set screw, there is a fixed stop 85. The fixed stop 85 can be realized in the form of a spacer ring and cannot be adjusted, but can be modified very easily to a defined height for a specific vehicle model. One advantage of the embodiment illustrated in FIG. 4 over the embodiment illustrated in FIG. 2 is that the cover 103 can completely close the armature reaction chamber 89. The cover 103 can also comprise the area which is otherwise covered by the set screw 91. Consequently, no stop seal or gasket 87 like the one in FIG. 2 is preferably required. The adjustability regarding the normal operation of the pilot valve 65 and of the magnetic control body 95 can be altogether identical with the function as explained in relation to FIG. 2.

Figure 5:
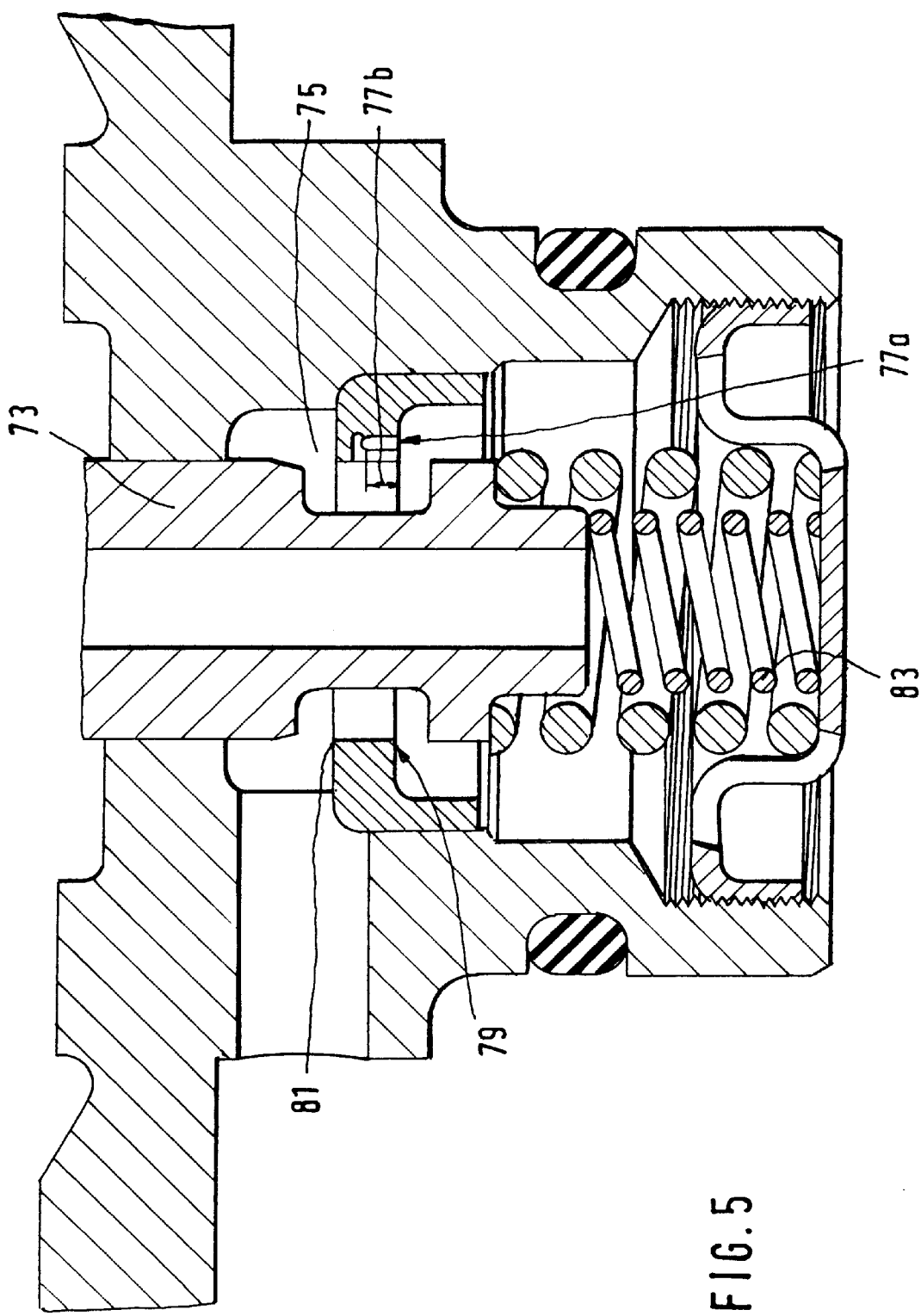
FIG. 5 shows a pilot valve with an emergency operating setting which is independent of distance or travel.

FIG. 5 shows a detail from FIGS. 3 or 4, because the configuration of the cross section for the emergency operating setting is preferably independent of the type of stop for the armature 69. The control edge 79, together with the tubular body of the armature 69, can represent a shutoff valve which is realized in the form of a gate valve. As soon as the weaker spring of the spring set 83 has pushed the armature 69 into the emergency operating position, the armature 69 can overlap the control edge 79, so that this flow path is blocked. There can be an emergency operating constant throttle 77a, the cross section of which is smaller than the adjacent cross section of the emergency operation constant throttle on the control edge 81 of the normal operation valve 75. The major advantage of this solution for emergency operation is that the unavoidable manufacturing tolerances of the valve parts can be compensated, because the overlap from the control edge 79 to the outlet of the emergency operating constant throttle can be available as the equalization distance 77b.

Figure 6:
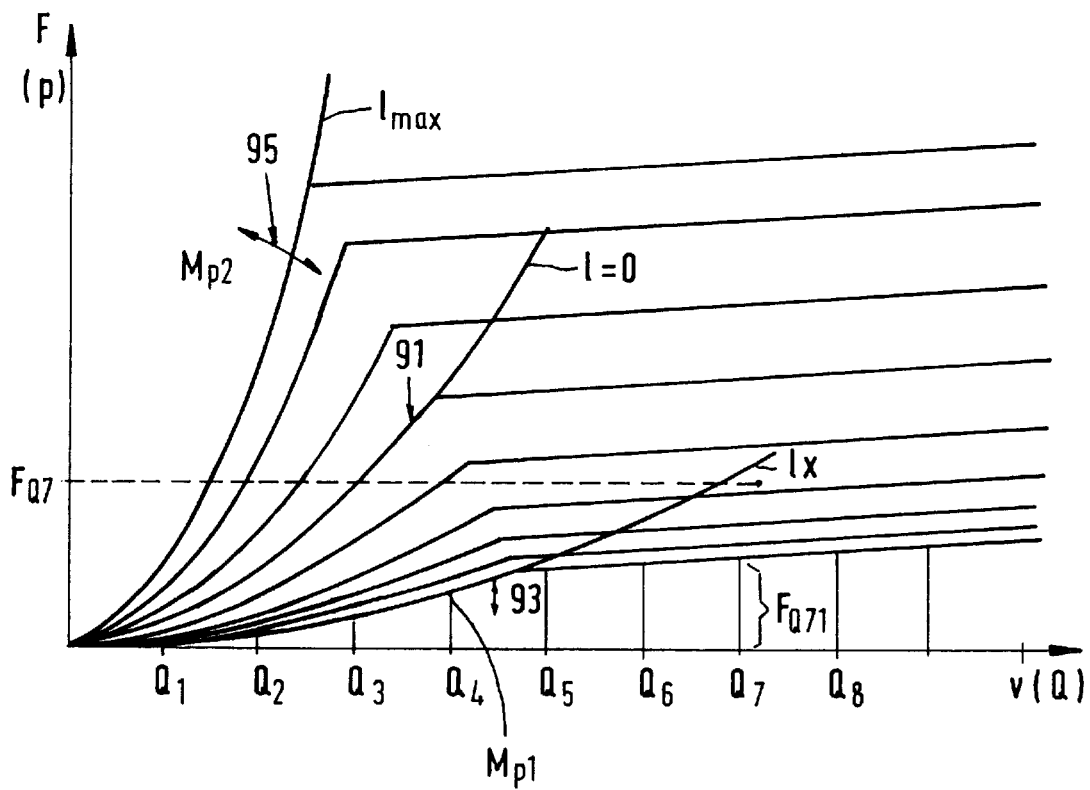
FIG. 6 shows a damping force characteristic for the shutoff valve device.

FIG. 6 illustrates the influence of the settings on the damping force characteristics. The family of damping force characteristics illustrated can be typical for this shutoff valve device 27. The area from the origin of the characteristic to the salient points can be influenced by the pilot valve 65. During the calibration of the pilot valve 65 the measurement points Q/p which are significant for the desired setting can be specified at a low flow and at a high flow. First, the measurement point $M_{P1}$ can be verified. If the measured value is above or below the desired characteristic, the measurement point can be raised or lowered by axially displacing the spring support plate 93 with reference to the specified Q-value, or for a given p-value, it can be displaced parallel to the ordinate. All the pilot characteristics can be influenced in this manner. The measurement point $M_{P2}$ can exhibit an excessive dynamic effect at $I_{max}$. By loosening the control body 95, the magnetic flux and thus the effect of the force on the armature 69 can be reduced. Thus, a dislocation or separation of the measurement point from the change of direction can be achieved, likewise for the setting of the spring support plate 93. The displacement of the various characteristics can be different as a function of the current or flow values of the individual pilot stage characteristics. In theory, when there is a high flow, the change of the pilot stage characteristic will preferably be more significant than with a characteristic at a lower flow. Consequently, the control body 95 can be used to achieve a spreading of the overall range of the pilot stage characteristic. This type of adjustment between the control body 95 and the spring support plate 93 may have to be repeated, because these two settings have an influence on one another.

After the settings for normal operation have been completed, the emergency operating setting can be accomplished by turning the set screw 91. The stop 85 can be displaced by means of the set screw 91 until the desired characteristic is achieved. This characteristic can be set as desired, e.g. a medium characteristic, but it can also be possible to set a characteristic which tends toward the hard or soft direction.

The designation I=O within the characteristic should not be any cause for concern, because the characteristic I=O can naturally also be achieved by the normal operation valve 75. It should be noted that the characteristic can then be produced by various valve parts within the pilot valve part. The setting I=O preferably has no influence on the flow-type characteristics.

Figure 7:
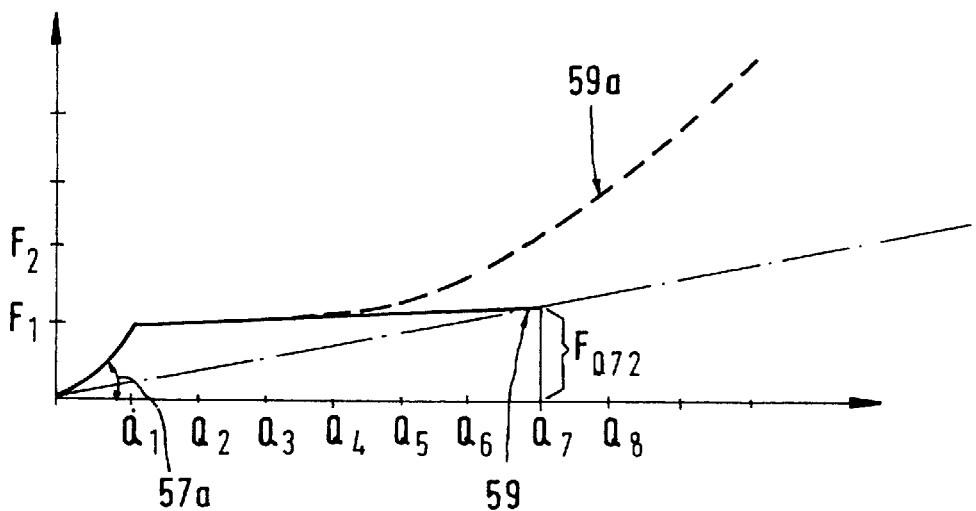
FIG. 7 shows damping force characteristics of the admission valve.

FIG. 7 shows damping force characteristics of the admission valve 55 which can be realized independently of the main stage valve 37. A very variable damping characteristic can be achieved by means of an appropriate configuration. For example, the influence of the pilot cross section 57a is clearly pronounced, whereby the slope can be kept flatter by a correspondingly larger opening. The portion of the characteristic represented by the pilot cross section 57a can be followed by a rather degressive branch of the characteristic. This part of the characteristic can be dependent solely on the type of bias of the valve discs 59, and on the characteristic of the valve disc 59, if the valve disc 59 is designed in the form of a spring plate. If necessary, it is also possible to achieve a linear characteristic if the pilot stage cross section 57a is omitted and the valve disc 59 is practically flat. The characteristic indicated by the broken line illustrates the influence of the pre-throttle or pilot throttle disc 59a. The pilot throttle disc 59a can result in a greater increase of the damping force at higher flow velocities.

The admission valve 55 and the main stage valve 37 can be hydraulically connected in series. Consequently, it is possible to simulate or modulate the main stage valve 37 very accurately. The effect achieved by the series connection can be easy to predict by preparing a desired characteristic field of the shutoff valve device 27 and entering the characteristic field of the main stage valve 37 and of the pilot valve 65 in this characteristic field. The differences in damping force must preferably be produced by the admission valve 55. By way of example, the reverse path can be illustrated in FIGS. 5 and 6 at a point with the volume flow $Q_7$. The volume flow $Q_7$ in FIG. 6 results in the damping force amount $F_{Q71}$. With the same volume flow, and with the admission valve 55, the damping force amount $F_{Q72}$ is obtained. The simple addition of the two individual damping force amounts then gives the joint damping force amount $F_{Q7}$ as illustrated in FIG. 6. The use of the admission valve 55 can always be particularly beneficial if the characteristic damping force curves of the pilot valve 65 and of the main stage valve 37 do not meet the requirements, i.e. a specified damping force value is not reached. There can be a requirement for relatively flat main stage characteristics, but particularly at large flow volumes $Q_X$, a larger damping force must be produced to prevent wheel shudder or shimmy. Frequently, a somewhat greater damping force is preferably desired in the characteristic range of the pilot valve 65. The damping force characteristic illustrated in FIG. 7 can be very effectively used, because it results in an increase in the damping force precisely at low volume flows, but otherwise increases or raises the characteristic uniformly.

It must be borne in mind that the admission valve 55 can make it possible to achieve a harder damping force characteristic without a greater flow to the magnet coil 67. The steeper the characteristic of the pilot valve 65, the greater the flow to the magnet coil must be, because the greater flow to the magnet coil 67 results in a closing movement of the pilot stage valve 65.

One feature of the invention resides broadly in the damping valve, in particular for a vibration damper, comprising a cylinder filled with damping medium, in which cylinder a piston rod with a piston is realized so that the piston rod can move axially and the piston divides the cylinder into two working chambers, whereby the damping valve can be adjusted by means of a magnet coil or solenoid in connection with an armature and has an emergency operating setting, characterized by the fact that for the valve position of the emergency operating setting, there is a stop 85, the position of which relative to the armature 69 can be used to define a passage cross section 77 for the emergency operating setting.

Another feature of the invention resides broadly in the damping valve characterized by the fact that the axial position of the stop 85 can be adjusted.

Yet another feature of the invention resides broadly in the damping valve characterized by the fact that the position of the stop 85 can be adjusted by means of a set screw or regulating screw 91.

Still another feature of the invention resides broadly in the damping valve characterized by the fact that the damping valve is located inside a housing 101 of a shutoff valve device 27, whereby the set screw 91 penetrates the housing so that access from outside the shutoff valve device is possible.

A further feature of the invention resides broadly in the damping valve characterized by the fact that the armature 69 has an emergency operation valve part 77 and a normal operation valve part 75 which interact with respective control edges 79, 81.

Another feature of the invention resides broadly in the damping valve characterized by the fact that the emergency operation valve part 77 has an emergency operating constant throttle, whereby the emergency operating constant throttle is smaller than a passage cross section which connects the emergency operating constant throttle to the control edge of the normal operation valve part.

Yet another feature of the invention resides broadly in the damping valve characterized by the fact that the maximum diameter of the armature 69 is not larger than the diameter of the set screw 91, that the valve part 77 of the armature 69, which lies on the other side of both control edges 79, 81, is realized in the form of a gate valve or slide valve, so that the armature can be removed from the damping valve after the set screw has been removed.

Still another feature of the invention resides broadly in the damping valve characterized by the fact that there is an axial separation 91*a* between the set screw 91 and the end of the armature 69 closer to the set screw in the emergency operating setting.

A further feature of the invention resides broadly in the damping valve characterized by the fact that the set screw 91 has a bearing 111 for the armature 69.

Another feature of the invention resides broadly in the damping valve characterized by the fact that the stop 85 has snap hooks 85*a* which apply a bias to a stop seal or gasket 87 which seals an armature reaction chamber 89 from the surrounding damping valve.

Yet another feature of the invention resides broadly in the damping valve characterized by the fact that the stop 85 is realized in the form of a spacer ring which is located in the direction of movement of the armature toward the emergency operating setting of the damping valve.

Still another feature of the invention resides broadly in the damping valve characterized by the fact that the stop 85 is made of an elastic material.

A further feature of the invention resides broadly in the damping valve characterized by the fact that the stop 85 is made of a material which has a low relative permeability.

Another feature of the invention resides broadly in the damping valve characterized by the fact that the adjustable damping valve 37 is actuated by a pilot valve 65, and the pilot valve is connected to a control chamber 51 via an opening 43*a*, whereby by means of a pressure in the control chamber, a closing force is exerted on the shutoff valve body 43 and the pressure in the control chamber is a function of the magnitude of a throttle cross section 75, 77, the magnitude of which can be modified by means of an actuator 67, 69, whereby the throttle cross section of the pilot valve for the damping valve influences the pilot cross section.

Examples of adjustable hydraulic vibration dampers with damping valves which may possibly be utilized or adapted for use in the context of the present invention may be disclosed in the following patents: U.S. Pat. No. 4,635,765, entitled "Adjustable Hydraulic Damper Apparatus"; U.S. Pat. No. 4,650,042, entitled "Hydraulic Adjustable Shock Absorber"; U.S. Pat. No. 4,723,640, entitled "Adjustable Hydraulic Vibration Damper"; U.S. Pat. No. 4,785,920, entitled "Hydraulic Adjustable Shock Absorber"; U.S. Pat. No. 4,850,460, entitled "Hydraulic Adjustable Shock Absorber"; U.S. Pat. No. 5,265,703, entitled "Adjustable Hydraulic Vibration Damper for Motor Vehicles"; U.S. Pat. No. 5,301,776, entitled "Hydraulic Adjustable Vibration Damper"; U.S. Pat. No. 5,335,757, entitled "Hydraulic Adjustable Vibration Damper"; U.S. Pat. No. 5,392,885, entitled "Adjustable Hydraulic Vibration Damper for Motor Vehicles"; U.S. Pat. No. 5,435,421, entitled "Hydraulic Adjustable Vibration Damper and a Valve System for a Hydraulic, Adjustable Vibration Damper"; and U.S. Pat. No. 5,558,189, entitled "Adjustable Hydraulic Vibration Damper".

U.S. patent application, Ser. No. 08/878,721, filed on Jun. 19, 1997, and claiming priority from German Application Numbers 196 24 895.7, DE-OS 196 24 895.7 and DE-PS 196 24 895.7 filed on Jun. 21, 1996, and having Attorney Docket No. NHL-FIS-296, and having inventor Andreas Forster and having the title "Vibration Damper, such as for a Motor Vehicle, with Adjustable Damping Force" is hereby incorporated by reference as if set forth in its entirety herein.

U.S. patent application, Ser. No. 08/879,158, filed on Jun. 20, 1997, and claiming priority from German Application Numbers 196 24 898.1, DE-OS 196 24 898.1 and DE-PS 196 24 898.1 filed on Jun. 21, 1996, and having Attorney Docket No. NHL-FIS-300, and having inventor Andreas Forster and having the title "A Vibration Damper and a Vibration Damper with a Damping Valve having an Adjustable Damping Force" is hereby incorporated by reference as if set forth in its entirety herein.

The components disclosed in the various publications, disclosed or incorporated by reference herein, may be used in the embodiments of the present invention, as well as, equivalents thereof.

All of the patents, patent applications and publications recited herein, and in the Declaration attached hereto, are hereby incorporated by reference as if set forth in their entirety herein.

The corresponding foreign patent publication applications, namely, Federal Republic of Germany Patent Application No. 196 24 897.3, filed on Jun. 21, 1996, having inventor Andreas Forester, and DE-OS 196 24 897.3 and DE-PS 196 24 897.3, as well as their published equivalents, and other equivalents or corresponding applications, if any, in corresponding cases in the Federal Republic of Germany and elsewhere, and the references cited in any of the documents cited herein, are hereby incorporated by reference as if set forth in their entirety herein.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, means-plus-function clause are intended to cover the structures described herein as performing the recited function and not only structural equivalents but also equivalent structures.

The invention as described hereinabove in the context of the preferred embodiments is not to be taken as limited to all of the provided details thereof, since modifications and variations thereof may be made without departing from the spirit and scope of the invention.

What is claimed is:

1. A vibration damper for a motor vehicle, said vibration damper comprising:

a cylinder;

said cylinder being configured to contain a damping medium;

said cylinder comprising a first end and a second end;

said first end of said cylinder being configured and disposed to operatively connect to a first part of a motor vehicle;

said second end of said cylinder being disposed opposite said first end of said cylinder;

a piston rod;

said piston rod sealingly projecting into said second end of said cylinder;

said piston rod comprising a first end and a second end;

said first end of said piston rod being configured and disposed to operatively connect to a second part of a motor vehicle;

said second end of said piston rod being disposed opposite said first end of said piston rod;

a piston;

said piston being disposed on said second end of said piston rod;

said piston being configured and disposed to slide within said cylinder;

said piston being configured and disposed to divide said cylinder into at least one working chamber;

another chamber;

said another chamber being disposed adjacent to said cylinder;

a damping valve;

said damping valve being configured and disposed to permit flow of damping medium between said at least one working chamber and said another chamber;

said damping valve being configured to vary flow of said damping medium through said damping valve;

said damping valve comprising an armature structure;

said armature structure being configured and disposed to regulate flow of said damping medium through said damping valve;

said damping valve comprising a passageway for flow of said damping medium through said damping valve;

said passageway having a cross section;

the cross section of said passageway being adjustable by said armature structure;

said damping valve comprising a solenoid;

said solenoid being configured and disposed to displace said armature structure to adjust the cross section of said passageway;

said damping valve comprising a stop element;

said stop element being disposed to make contact with said armature structure and being disposed in a position to stop movement of said armature structure;

said armature structure upon being disposed in contact with said stop element providing an emergency operation cross section of said passageway for emergency operation of said damping valve upon said damping valve being substantially unable to vary flow of said damping medium through said damping valve;

said stop element being displaceable to adjust the position of said stop element to stop movement of said armature structure;

said damping valve comprising an adjusting member;

said adjusting member being configured and disposed to displace said stop element to adjust the position of said stop element;

said armature structure comprising a shaft member;

said shaft member comprising a first valve part and a second valve part;

said damping valve comprising a third valve part;

said third valve part being disposed between said first valve part and said second valve part;

said third valve part comprising a first surface and a second surface;

said first surface of said third valve part being disposed adjacent to said first valve part;

said first surface of said third valve part and said first valve part are configured and disposed to together form a first portion of said passageway;

said second surface of said third valve part being disposed adjacent to said second valve part;

said second surface of said third valve part and said second valve part being configured and disposed to together form a second portion of said passageway;

said second surface of said third valve part and said second valve part being configured and disposed to together form at least a portion of the emergency operation cross section of said passageway upon said armature structure being disposed in contact with said stop element;

said adjusting member comprising a set screw;

said shaft member of said armature structure comprising a first end and a second end;

said first end of said shaft member being disposed adjacent to said adjusting member;

said second end of said shaft member being disposed opposite said first end of said shaft member;

said set screw being configured and disposed to permit at least a portion of said first end of said shaft member to slide within said set screw; and said first end of said shaft member and said set screw being configured and disposed to together form a space between said first end of said shaft member and said set screw upon said armature structure being disposed in contact with said stop element.

2. The vibration damper according to claim 1, wherein:

said vibration damper comprises a housing;

at least a portion of said damping valve is disposed within said housing;

said set screw is configured and disposed to project through said housing to permit adjustment of said stop element from outside said housing.

3. The vibration damper according to claim 2, wherein:
said armature structure comprises an armature;
said armature is disposed about said shaft member;
said armature has a first diameter;
said set screw has a second diameter;
said second diameter is greater than said first diameter;
said first valve part is disposed adjacent to said armature;
said first valve part comprises a gate valve; and
said armature structure is configured to be removable from said damping valve upon removal of said set screw from said damping valve.

4. The vibration damper according to claim 3, wherein:
said armature comprises an armature chamber;
said stop element and said armature are configured and disposed to form at least a portion of said armature chamber;
said damping valve comprises a gasket;
said gasket is disposed between said stop element and said set screw; and
said gasket is configured and disposed to seal said armature chamber.

5. The vibration damper according to claim 4, wherein:
said stop element comprises at least one snap hook;
said at least one snap hook is configured and disposed to connect said stop element to said set screw; and
said at least one snap hook is configured and disposed to apply a bias to said gasket.

6. The vibration damper according to claim 5, wherein:
said set screw comprises a bearing;
said bearing is disposed adjacent to said first end of said shaft member; and
said bearing is configured to guide said first end of said shaft member.

7. The vibration damper according to claim 6, wherein:
one of said said second valve part and said third valve part comprises an opening;
said opening is configured and disposed to permit flow of said damping medium into said first portion of said passageway upon said armature structure being disposed in contact with said stop element;
said opening has a cross section;
said first portion of said passageway has a cross section; and
said cross section of said first portion of said passageway is substantially greater than said cross section of said opening.

8. The vibration damper according to claim 7, wherein:
said stop element comprises an elastic material; and
said stop element comprises a material having a relative magnetic permeability substantially equal to one.

9. The vibration damper according to claim 8, wherein:
said stop element comprises a ring shaped member;
said ring shaped member is disposed about said shaft member;
said ring shaped member is disposed substantially adjacent to said at least one snap hook; and
said ring shaped member is disposed to contact said armature to stop movement of said armature structure.

10. The vibration damper according to claim 9, wherein:
said damping valve comprises a connection disposed to connect said passageway to said another chamber;
said damping valve comprises a control chamber;
said control chamber is configured to contain a damping medium;
said passageway is configured and disposed to connect said control chamber to said connection;
said damping valve comprises a valve member;
said valve member is configured and disposed to form at least a portion of said control chamber;
said valve member is deformable to permit flow of damping medium into said control chamber from said at least one working chamber;
said opening is a first opening;
said valve member comprises a second opening;
said second opening is configured and disposed to permit flow of damping medium into said control chamber from said at least one working chamber;
said damping medium in said control chamber having a pressure;
one of said first portion of said passageway and said second portion of said passageway being configured to limit flow of said damping medium through said passageway;
the pressure of said damping medium in said control chamber is controlled by said one of said first portion of said passageway and said second portion of said passageway limiting flow of said damping medium through said passageway;
said second portion of said passageway has a cross section; and
said cross section of said first portion of said passageway and said cross section of said second portion of said passageway are adjustable upon movement of said first valve part and said second valve part by said solenoid and said armature.

11. The vibration damper according to claim 10, wherein:
said first valve part is disposed on said second end of shaft member;
said second valve part is disposed on said second end of said shaft member;
said second valve part comprises said first opening;
said damping valve comprises a spring arrangement;
said spring arrangement is disposed to contact said second end of said shaft member;
said spring arrangement being configured and disposed to move said armature into contact with said stop element upon said solenoid being substantially unable to displace said armature structure;
said damping valve comprises a spring plate;
said spring plate is disposed between said control chamber and said spring arrangement;
said spring plate is configured to form a portion of said control chamber;
said spring plate is configured to be displaceable to adjust tension by said spring arrangement on said second end of said shaft member;
said housing comprises a locator member;
said locator member is configured and disposed to at least partially enclose said solenoid;
said bearing is a first bearing;
said damping valve comprises a second bearing;
said second bearing is disposed between said locator member and said second end of said shaft member;

said second bearing is configured to guide said second end of said shaft member;

said damping valve comprises a magnetic control body; and said magnetic control body is configured and disposed to adjust displacement of said armature structure by said solenoid.

12. The vibration damper according to claim 11, wherein:

said at least one working chamber comprises a first working chamber and a second working chamber;

said first working chamber is disposed adjacent to said first end of said cylinder;

said second working chamber is disposed adjacent to said second end of said cylinder;

said piston comprises a first valve arrangement;

said first valve arrangement is configured and disposed to permit flow of damping medium between said first working chamber and said second working chamber;

said first end of said cylinder comprises a base plate;

said base plate is configured and disposed to least partially seal said first end of said cylinder;

said base plate comprises a second valve arrangement;

said second valve arrangement is configured and disposed to permit flow of damping medium between said first working chamber and said another chamber;

said second end of said cylinder comprises a guiding arrangement;

said guiding arrangement is configured and disposed to guide said piston rod into said second end of said cylinder;

said damping valve comprises an insulator arrangement;

said insulator arrangement is disposed between said armature and said locator member;

said damping valve comprises a valve apparatus;

said connection comprises a first connection;

said damping valve comprises a second connection;

said second connection is configured and disposed to connect said second working chamber to said valve apparatus; and said valve apparatus is configured and disposed to adjust flow of damping medium between said control chamber and said second working chamber.

13. In a vibration damper for a motor vehicle having a cylinder, the cylinder being configured to contain a damping medium, the cylinder comprising a first end and a second end, the first end of the cylinder being configured and disposed to operatively connect to a first part of a motor vehicle, the second end of the cylinder being disposed opposite the first end of the cylinder, a piston rod, the piston rod sealingly projecting into the second end of the cylinder, the piston rod comprising a first end and a second end, the first end of the piston rod being configured and disposed to operatively connect to a second part of a motor vehicle, the second end of the piston rod being disposed opposite the first end of the piston rod, a piston, the piston being disposed on the second end of the piston rod, the piston being configured and disposed to slide within the cylinder, the piston being configured and disposed to divide the cylinder into at least one working chamber, another chamber, the another chamber being disposed adjacent to the cylinder, said vibration damper comprising:

a damping valve;

said damping valve being configured and disposed to permit flow of damping medium between the at least one working chamber and the another chamber;

said damping valve being configured to vary flow of damping medium through said damping valve;

said damping valve comprising an armature structure;

said armature structure being configured and disposed to regulate flow of damping medium through said damping valve;

said damping valve comprising a passageway for flow of damping medium through said damping valve;

said passageway having a cross section;

the cross section of said passageway being adjustable by said armature structure;

said damping valve comprising a solenoid;

said solenoid being configured and disposed to displace said armature structure to adjust the cross section of said passageway;

said damping valve comprising a cover portion;

said damping valve comprising a spacer ring;

said spacer ring being disposed between said cover portion and said armature structure;

said spacer ring being disposed to make contact with said armature structure and being disposed in a position to stop movement of said armature structure;

said spacer ring being configured to provide a predetermined distance between said armature and said cover portion upon contact of said armature with said spacer ring; and said armature structure upon being disposed in contact with said spacer ring providing an emergency operation cross section of said passageway for emergency operation of said damping valve upon said damping valve being substantially unable to vary flow of damping medium through said damping valve.

* * * * *